United States Patent
Nagu et al.

(10) Patent No.: US 11,434,413 B1
(45) Date of Patent: Sep. 6, 2022

(54) FLOURINATED AROMATIC COMPOUND AS REFINERY CORROSION INHIBITOR

(71) Applicant: Saudi Arabian Oil Company, Dhahran (SA)

(72) Inventors: Muthukumar Nagu, Dhahran (SA); Nayef M. Alanazi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/314,149

(22) Filed: May 7, 2021

(51) Int. Cl.
*C09K 8/54* (2006.01)

(52) U.S. Cl.
CPC ............ *C09K 8/54* (2013.01); *C09K 2208/32* (2013.01)

(58) Field of Classification Search
CPC .............................. C09K 8/54; C09K 2208/32
See application file for complete search history.

(56) References Cited

U.S. PATENT DOCUMENTS

| | | |
|---|---|---|
| 3,692,681 A | 9/1972 | Liston |
| 5,252,254 A | 10/1993 | Babian-Kibala |
| 5,314,643 A | 5/1994 | Edmondson et al. |
| 5,500,107 A | 3/1996 | Edmondson |
| 5,543,388 A | 8/1996 | Williams et al. |
| 5,863,415 A | 1/1999 | Zetlmeisl |
| 6,559,104 B2 | 5/2003 | Sartori et al. |
| 6,583,091 B2 | 6/2003 | Sartori et al. |
| 6,593,278 B2 | 7/2003 | Yeganeh et al. |
| 8,916,722 B2 | 12/2014 | Yaghi et al. |
| 9,090,837 B2 | 7/2015 | Subramaniyam |
| 9,115,319 B2 | 8/2015 | Subramaniyam |
| 9,228,142 B2 | 1/2016 | Subramaniyam |
| 9,238,588 B2 | 1/2016 | Harrington et al. |
| 9,340,759 B2 | 5/2016 | Kim et al. |
| 9,370,771 B2 | 6/2016 | Gaab et al. |
| 9,567,547 B2 | 2/2017 | Sumiejeski et al. |
| 9,688,605 B2 | 6/2017 | McGuiness |
| 9,890,625 B2 | 2/2018 | Portwood |
| 10,294,757 B2 | 5/2019 | Fursdon-Welsh et al. |
| 10,435,496 B2 | 10/2019 | Reed et al. |
| 10,450,500 B2 | 10/2019 | Reed et al. |
| 2014/0187455 A1 | 7/2014 | Umehara et al. |
| 2014/0208650 A1 | 7/2014 | Gaab et al. |
| 2016/0145487 A1* | 5/2016 | Alam ............... C09K 8/74 507/209 |
| 2017/0362464 A1 | 12/2017 | Reichardt et al. |
| 2018/0148632 A1 | 5/2018 | Bennett |
| 2018/0230333 A1 | 8/2018 | Reichardt et al. |
| 2020/0299547 A1 | 9/2020 | Deaschlein et al. |

FOREIGN PATENT DOCUMENTS

| | | | |
|---|---|---|---|
| CN | 102732896 A | | 10/2012 |
| CN | 111100724 A | * | 5/2020 |
| EP | 3406762 A1 | | 11/2018 |
| WO | 2009053971 A1 | | 4/2009 |

OTHER PUBLICATIONS

Farook, Adam et al., "The complete conversion of cyclohexane into cyclohexanol and cyclohexanone by a simple silica-chromium heterogeneous catalyst." Applied Catalysis A: General 357.1 (2009): 93-99.

International Search Report and Written Opinion in Corresponding PCT Application No. PCT/US2020/064804 dated Apr. 6, 2021. 4 pages.

International Search Report and Written Opinion in Corresponding PCT Application No. PCT/US2021/037201, dated Sep. 21, 2021., 10 pages.

International Preliminary Report on Patentability in corresponsing PCT Application No. PCT/US2020/064804, dated Feb. 23, 2022.

Notice of Allowance in Corresponding U.S. Appl. No. 17/304,815 dated Feb. 24, 2022.

Office Action in Corresponding U.S. Appl. No. 16/715,637 dated Sep. 30, 2021.

Notice of Allowance in Corresponding U.S. Appl. No. 16/715,637 dated Jan. 27, 2022.

* cited by examiner

*Primary Examiner* — Kumar R Bhushan
(74) *Attorney, Agent, or Firm* — Leason Ellis LLP

(57) ABSTRACT

Corrosion inhibitor compositions and methods for inhibiting corrosion on a metal surface exposed to a hydrocarbon fluid are provided. The corrosion inhibition composition can comprise tetrafluoroterephthalic acid, dimethyl sulfoxide, and heavy aromatic naphtha. The corrosion inhibitor composition can be phosphate-free and can inhibit naphthenic acid corrosion. In the methods, the corrosion inhibitor composition is added to the hydrocarbon fluid exposed to the metal surface to prevent or inhibit corrosion on the metal surface, including naphthenic acid corrosion.

3 Claims, No Drawings

FLOURINATED AROMATIC COMPOUND AS REFINERY CORROSION INHIBITOR

TECHNICAL FIELD

The present disclosure is generally related to chemical compositions, and more particularly related to corrosion inhibitor compositions.

BACKGROUND OF THE DISCLOSURE

In oil and gas facilities, corrosion is a persistent problem in equipment, piping, and pipelines that are exposed to corrosive fluids, including hydrocarbon feeds. In particular, naphthenic acid corrosion is common in refinery processes that occur at high temperatures (e.g., 200° C. to 400° C.), such as refinery processes that process crude oil and its various fractions. For example, distillation of an acidic crude oil can result in naphthenic acid corrosion. In some circumstances, naphthenic acid corrosion can be predicted in a given refinery apparatus based on the total acid number (TAN) of the fluid that is exposed to the apparatus.

Conventionally, corrosion inhibitors and corrosion-resistant alloys (CRAs) are often used to mitigate naphthenic acid corrosion. Phosphate-based corrosion inhibitors are known to have some effectiveness in controlling naphthenic acid corrosion. However, phosphate-based corrosion inhibitors have negative effects on downstream refinery units, as these types of inhibitors can result in catalyst poisoning (partial or complete deactivation of the catalyst), for example.

The present application addresses these and other challenges related to mitigating and preventing corrosion in refinery equipment.

SUMMARY OF THE DISCLOSURE

In a first aspect, a corrosion inhibitor composition is provided. The corrosion inhibitor composition, comprises tetrafluoroterephthalic acid (TFTA), dimethyl sulfoxide, and heavy aromatic naphtha, and the corrosion inhibitor composition inhibits naphthenic acid corrosion.

In another aspect, the corrosion inhibitor composition comprises approximately 5-15 weight % of TFTA, 75-85 weight % of dimethyl sulfoxide, and 5-15 weight % heavy aromatic naphtha. In another aspect, the corrosion inhibitor composition comprises approximately 10 weight % of TFTA, 80 weight % of dimethyl sulfoxide, and 10 weight % heavy aromatic naphtha.

In another aspect, the corrosion inhibitor composition is free of phosphate.

In a second aspect, a method for inhibiting corrosion on a metal surface exposed to a hydrocarbon fluid. In the method, a corrosion inhibitor composition is added to the hydrocarbon fluid exposed to the metal surface, where the corrosion inhibitor composition comprises TFTA, dimethyl sulfoxide, and heavy aromatic naphtha.

In another aspect of the method, the corrosion inhibitor composition is added to the hydrocarbon fluid in a concentration of approximately 100 ppm to approximately 1000 ppm. In a further aspect, the corrosion inhibitor composition comprises approximately 5-15 weight % of TFTA, 75-85 weight % of dimethyl sulfoxide, and 5-15 weight % heavy aromatic naphtha, and the corrosion inhibitor composition is added to the hydrocarbon fluid in a concentration of approximately 250 ppm to approximately 500 ppm.

In another aspect, the corrosion inhibitor composition comprises approximately 10 weight % of TFTA, 80 weight % of dimethyl sulfoxide, and 10 weight % heavy aromatic naphtha, and the corrosion inhibitor composition is added to the hydrocarbon fluid in a concentration of approximately 250 ppm.

In another aspect, the corrosion inhibitor composition is added to the hydrocarbon fluid in a refinery process, wherein the refinery process is performed at a temperature of approximately 200° C. to approximately 400° C., and wherein the corrosion inhibitor composition inhibits naphthenic acid corrosion on the metal surface. In a further aspect, the refinery process is performed at a temperature of approximately 300° C.

DETAILED DESCRIPTION OF CERTAIN EMBODIMENTS

The present application discloses compositions and methods for inhibiting corrosion on metal surfaces exposed to hydrocarbon fluids. In one or more embodiments, the corrosion inhibitor compositions of the present application are phosphate-free and can comprise a tetrafluoroterephthalic acid, dimethyl sulfoxide, and heavy aromatic naphtha.

In one or more embodiments of the present methods, a corrosion inhibitor composition of the present application can be added to a hydrocarbon fluid in a refinery process in which the hydrocarbon fluid is exposed to one or more metal surfaces. The addition of the corrosion inhibitor composition to the hydrocarbon fluid can mitigate or prevent corrosion on the metal surfaces typically caused by the hydrocarbon fluid. For example, the present compositions and methods can be used to mitigate or prevent naphthenic acid corrosion that is induced during high-temperature (e.g., 200° C. to 400° C.) refinery processes, such as distillation of an acidic crude oil. In such an embodiment, the present corrosion inhibitor composition is added to the acidic crude oil, thereby reducing the amount of naphthenic acid corrosion that occurs on the metal surfaces exposed to the acidic crude oil.

As such, the present compositions and methods can be used to reduce corrosion, such as naphthenic acid corrosion, in refinery units, such as vacuum distillations units, crude distillation units, furnaces, and other refinery units that are exposed to hydrocarbon fluids. These and other aspects of the present compositions and methods are described in further detail below with reference to the accompany drawing figures, in which one or more illustrated embodiments and/or arrangements of the corrosion inhibitors are shown. The compositions and methods of the present application are not limited in any way to the illustrated embodiments and/or arrangements. It should be understood that the compositions and methods as shown in the accompanying figures are merely exemplary of the compositions and methods of the present application, which can be embodied in various forms as appreciated by one skilled in the art. Therefore, it is to be understood that any structural and functional details disclosed herein are not to be interpreted as limiting the present compositions and methods, but rather are provided as a representative embodiment and/or arrangement for teaching one skilled in the art one or more ways to implement the present compositions and methods.

The corrosion inhibitor compositions of the present application generally comprise at least tetrafluoroterephthalic acid (2,3,5,6-Tetrafluoro-1,4-benzenedicarboxylic acid). The chemical structure of tetrafluoroterephthalic acid (TFTA) in is shown below.

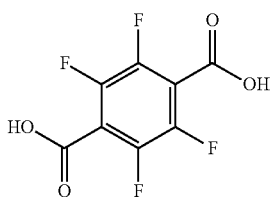

In one or more implementations, the TFTA is the compound identified by CAS #652-36-8. The corrosion inhibitor compositions of the present application also comprise dimethyl sulfoxide and heavy aromatic naphtha. In one or more implementations, the dimethyl sulfoxide is the compound identified by CAS #67-68-5. In one or more implementations, the heavy aromatic naphtha is the compound identified by CAS #64742-94-5.

The corrosion inhibitors compositions of the present application are free of phosphates. As such, the present compositions do not have the same negative effects on downstream refinery units that phosphate-based corrosion inhibitors do. For example, refinery units, such as fluid catalytic cracking (FCC) units and naphtha hydrotreater (NHT) units, are generally downstream of the units that are affected by naphthenic acid corrosion. These FCC and NHT units generally include catalysts that, upon interaction with phosphate groups, become partially or complete deactivated ("catalyst poisoning"), thereby hindering the reactions of the FCC and NHT units. As such, while some conventional phosphate-based corrosion inhibitors mitigate naphthenic acid corrosion, their effectiveness in mitigating corrosion is negated by their downstream effects on catalysts. In contrast, the phosphate-free corrosion inhibitor compositions of the present application are effective at reducing and/or preventing naphthenic acid corrosion, and do not cause catalyst poisoning in downstream operations.

In one or more embodiments, the corrosion inhibitor composition of the present application can comprise approximately 5-15 weight % of TFTA, approximately 75-85 weight % of dimethyl sulfoxide, and approximately 5-15 weight % heavy aromatic naphtha. In at least one embodiment, the composition can comprise approximately 10 weight % of TFTA, approximately 80 weight % of dimethyl sulfoxide, and approximately 10 weight % heavy aromatic naphtha. In the present application, it should be understood that the term "approximately", when used in conjunction with a number, refers to any number within 5% of the referenced number, including the referenced number.

In one or more embodiments, the present application also discloses methods for inhibiting corrosion on a metal surface that is exposed to a hydrocarbon fluid. The present methods utilize the corrosion inhibitor compositions discussed above. In one or more embodiments, the method can comprise adding a corrosion inhibitor composition of the present application to a hydrocarbon fluid exposed to the metal surface. The hydrocarbon fluid can be in-use in a metal refinery unit, such as a crude distillation unit, vacuum distillation unit, or furnace. The addition of the corrosion inhibitor composition to the hydrocarbon fluid can reduce corrosion on the metal surfaces typically caused by the hydrocarbon fluid.

In one or more embodiments of the present methods, the corrosion inhibitor compositions can mitigate or prevent naphthenic acid corrosion that is induced during high-temperature (e.g., approximately 200° C. to 400° C.) refinery processes, such as distillation of an acidic crude oil. For example, in one or more embodiments, at least one of the present corrosion inhibitor compositions can be added to an acidic crude oil that is used in a high-temperature refinery unit, such as a crude distillation unit. Acidic crude oil can cause naphthenic acid corrosion on the metal surfaces of a crude distillation unit over time. However, the addition of the corrosion inhibitor composition to the acidic crude oil mitigates the occurrence naphthenic acid corrosion or, in certain implementations, prevents naphthenic acid corrosion from occurring on the metal surfaces exposed to the acidic crude oil.

In one or more embodiments, the corrosion inhibitor composition is added to the hydrocarbon fluid (e.g., acidic crude oil) after it enters the refinery unit. As such, in one or more embodiments, the corrosion inhibitor composition(s) of the present application can be continuously added in the hydrocarbon fluid at a selected amount, measured in parts per million (ppm) for example, to protect the refinery equipment from naphthenic acid corrosion.

In one or more embodiments of the present methods, the corrosion inhibitor composition can be added to the hydrocarbon fluid in a concentration of approximately 100 ppm to approximately 1000 ppm. In at least one embodiment, the corrosion inhibitor composition can be added to the hydrocarbon fluid in a concentration of approximately 250 ppm to approximately 500 ppm. In at least one embodiment, the corrosion inhibitor composition can be added to the hydrocarbon fluid in a concentration of approximately 250 ppm.

For example, in at least one embodiment, a corrosion inhibitor composition comprising approximately 10 weight % of TFTA, approximately 80 weight % of dimethyl sulfoxide, and approximately 10 weight % heavy aromatic naphtha can be added to a hydrocarbon fluid in a concentration of approximately 250 ppm.

Additional aspects and advantages of the present compositions and methods are further described in the Example Section below, in which one or more illustrated embodiments and/or arrangements of the compositions and methods are shown and discussed.

Corrosion Test

In the present example, a formulation of the present corrosion inhibitor composition was tested to show its ability to inhibit naphthenic acid corrosion on metal coupons exposed to a hydrocarbon stream in accordance with one or more embodiments herein.

Specifically, a rotating cage autoclave corrosion test was performed to measure the corrosion inhibition efficiency of the formulation. The test was performed in accordance with ASTM standard G170. A hydrocarbon fluid comprising 310 gm (about 350 mL) of mineral oil heavy (CAS #8042-47-5) was provided to the rotating cage autoclave cell and 4.2 gm (about 4.56 mL) of naphthenic acid (CAS #1338-24-5; commercial grade with acid value of 230 mg KOH/g) was added to the fluid to make a test solution having a TAN value of 3 mg KOH/g.

A formulation of the corrosion inhibitor composition in accordance with one or more embodiments of the present application—specifically a composition comprising 10 weight % of TFTA, approximately 80 weight % of dimethyl sulfoxide, and approximately 10 weight % heavy aromatic naphtha ("formulation 1" in Table 1 below)—was tested against the use of no corrosion inhibitor.

This formulation of the corrosion inhibitor composition of the present application was added in a test solution to observe the resulting corrosion rate and corrosion inhibition percentage. The results of the experiment are shown in Table 1, below.

In the experiment, the mixture of the test solution and the above formulation of the corrosion inhibitor composition were exposed to a metal coupon in the test cell. A control run was also done in which no corrosion inhibitor composition was added to the test solution. Nitrogen gas purging was performed to remove the oxygen content in the test solution as well as in the test cell. The experimental conditions were as follows:

Test temperature: 300° C.
Rotating speed: 1000 rpm
Atmosphere: Nitrogen
Corrosion specimen: Carbon Steel (C1018).

These conditions were maintained for three hours. After the procedure, the metal coupons (corrosion specimens) were removed, excess oil was rinsed away, and the excess corrosion product was removed from the surface of the metal coupons using Clarke's solution (ASTM G1). Each metal coupon was then weighed, and the corrosion rate was calculated in mils per year (MPY). The detailed steps of the rotating cage autoclave corrosion test are shown below:

1. Add 310 gm (350 ml) of mineral oil heavy in the autoclave.
2. Add the naphthenic acid to the mineral oil heavy to achieve a test solution having an acid value of TAN 3.0 mg KOH/g (the naphthenic acid is 4.2 gm with acid value of 230 mg KOH/g).
3. Add desired dosage of corrosion inhibitor formulation to the test solution and mix well.
4. Mount pre-weighed metal coupons in the autoclave, and set the temperature to 100° C.
5. Close the autoclave, start heating and keep the stirring the solution at 500 rpm with continuous nitrogen gas purging for about 30-45 minutes and, after that, increase the rpm of cage speed to 1000 rpm.
6. Increase temperature of heating to 150° C. and stop nitrogen gas purging.
7. Begin raising the temperature to a test temperature 300° C.
8. Continue heating to raise the temperature to the test temperature of 300° C., and mix the mixture at 1000 rpm, for 3 hours.
9. Cool the autoclave temperature to 60° C.
10. Remove the metal coupons and clean them initially with toluene/acetone and then with Clarke's solution (ASTM G1) to remove the corrosion product.
11. Dry and weigh the metal coupons.
12. Calculate the naphthenic acid corrosion inhibition efficiency.

The corrosion inhibition efficiency was calculated using the below equations. For each of the test formulations, corrosion inhibition efficiency was calculated by comparing weight loss of the metal coupon due to the respective test formulations with weight loss of metal coupon in the test run without a corrosion inhibitor formulation.

Corrosion inhibition efficiency={(weight loss for coupon without corrosion inhibitor)−(weight loss for coupon with corrosion inhibitor)/(weight loss for coupon without corrosion inhibitor)}×100.

The corrosion rate in MPY (mils per year) was calculated by the following formula:

MPY={534×Weight loss in mg}/(Density in gm/cc)×(Area in inch$^2$)×(Test duration in hours).

The results obtained from the rotating cage experiments with and without the corrosion inhibitor composition are presented in Table 1 below. The corrosion rate of the control experiment (i.e., run 1, without a corrosion inhibitor) was 221 MPY. The results also showed that the formulation of the present corrosion inhibitor composition ("formulation 1") at a concentration of 250 ppm exhibited substantial decreases in corrosion rate relative to control (run 1). Notably, formulation 1 exhibited 89% corrosion inhibition efficiency at 250 ppm concentration (run 2) with a corrosion rate of 24 MPY.

TABLE 1

| Run | Hydrocarbon fluid | Total Acid Number (TAN) mg KOH/g | Corrosion inhibitor formulation | Concentration (ppm) | Corrosion Rate (MPY) | Corrosion Inhibition (%) |
|---|---|---|---|---|---|---|
| 1 | Mineral Oil (Heavy) | 3 | None | 0 | 221 | NA |
| 2 | Mineral Oil (Heavy) | 3 | Formulation 1 | 250 | 24 | 89 |

Accordingly, based on the experimental results, the corrosion inhibitor composition of formulation 1 showed high corrosion inhibition efficiency in high-temperature naphthenic acid conditions (i.e., 300° C. and 3 TAN mineral oil solution). As such, the present experimental runs show that the metal surfaces in refinery piping (e.g., furnaces, pump arounds) and equipment (e.g., crude distillation unit, vacuum distillation unit) are protected from naphthenic acid corrosion by adding the corrosion inhibitor composition of the present application to the corrosive fluids (e.g., 3 TAN mineral oil heavy).

Although much of the foregoing description has been directed to compositions and methods for inhibiting corrosion on metal surfaces in refineries or pipelines, the compositions and methods disclosed herein can be similarly deployed and/or implemented in scenarios, situations, and settings far beyond the referenced scenarios. It should be further understood that any such implementation and/or deployment is within the scope of the composition and methods described herein.

It is to be further understood that like numerals in the drawings represent like elements through the several figures, and that not all components and/or steps described and illustrated with reference to the figures are required for all embodiments or arrangements. Further, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms ""including," "comprising," or "having," "containing," "involving," and variations thereof herein, when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Notably, the figures and examples above are not meant to limit the scope of the present disclosure to a single implementation, as other implementations are possible by way of interchange of some or all of the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

The foregoing description of the specific implementations will so fully reveal the general nature of the disclosure that others can, by applying knowledge within the skill of the relevant art(s), readily modify and/or adapt for various applications such specific implementations, without undue experimentation, without departing from the general concept of the present disclosure. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). It is to be understood that dimensions discussed or shown are drawings are shown accordingly to one example and other dimensions can be used without departing from the disclosure.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A corrosion inhibitor composition, comprising:
   5-15 weight % of tetrafluoroterephthalic acid (TFTA);
   75-85 weight % of dimethyl sulfoxide; and
   5-15 weight % of heavy aromatic naphtha,
   wherein the corrosion inhibitor composition inhibits naphthenic acid corrosion.

2. The corrosion inhibitor composition of claim 1, wherein the composition comprises approximately:
   10 weight % of TFTA;
   80 weight % of dimethyl sulfoxide; and
   10 weight % heavy aromatic naphtha.

3. The corrosion inhibitor composition of claim 1, wherein the corrosion inhibitor composition is free of phosphate.

* * * * *

UNITED STATES PATENT AND TRADEMARK OFFICE
CERTIFICATE OF CORRECTION

| | |
|---|---|
| PATENT NO. | : 11,434,413 B1 |
| APPLICATION NO. | : 17/314149 |
| DATED | : September 6, 2022 |
| INVENTOR(S) | : Muthukumar Nagu and Nayef M. Alanazi |

It is certified that error appears in the above-identified patent and that said Letters Patent is hereby corrected as shown below:

On the Title Page

Item (54) and in the Specification Lines 1-2, Column 1:
"FLOURINATED AROMATIC COMPOUND AS REFINERY CORROSION INHIBITOR".
Should read: FLUORINATED AROMATIC COMPOUND AS REFINERY CORROSION INHIBITOR Signed and Sealed this
Eighteenth Day of October, 2022

Katherine Kelly Vidal
*Director of the United States Patent and Trademark Office*